(12) United States Patent
Rodriguez et al.

(10) Patent No.: US 11,042,725 B2
(45) Date of Patent: Jun. 22, 2021

(54) METHOD FOR SELECTING FRAMES USED IN FACE PROCESSING

(71) Applicant: Keylemon SA, Martigny (CH)

(72) Inventors: Yann Rodriguez, Vollèges (CH);
François Moulin, Vollèges (CH);
Sébastien Piccand, Martigny (CH);
Sara Sedlar, Martigny (CH)

(73) Assignee: Keylemon SA, Martigny (CH)

( * ) Notice: Subject to any disclaimer, the term of this patent is extended or adjusted under 35 U.S.C. 154(b) by 106 days.

(21) Appl. No.: 16/478,128

(22) PCT Filed: Dec. 16, 2016

(86) PCT No.: PCT/IB2016/057729
§ 371 (c)(1),
(2) Date: Jul. 15, 2019

(87) PCT Pub. No.: WO2018/109533
PCT Pub. Date: Jun. 21, 2018

(65) Prior Publication Data
US 2019/0384965 A1    Dec. 19, 2019

(51) Int. Cl.
*G06K 9/00* (2006.01)

(52) U.S. Cl.
CPC ..... *G06K 9/00228* (2013.01); *G06K 9/00597* (2013.01); *G06K 9/00711* (2013.01); *G06K 9/00906* (2013.01)

(58) Field of Classification Search
CPC ........... G06K 9/00221; G06K 9/00228; G06K 9/00261; G06K 9/00335; G06K 9/00597;
(Continued)

(56) References Cited

U.S. PATENT DOCUMENTS 8,856,541 B1    10/2014  Chaudhury et al. ..... G06F 21/36
2008/0267458 A1*  10/2008  Laganiere et al. ..........
                                                    G06K 9/00221
                                                         382/118
(Continued)

FOREIGN PATENT DOCUMENTS

WO    99/51022 A1    10/1999

OTHER PUBLICATIONS

Raghavender R Jillella et al. "Adaptive frame selection for improved face recognition in low-resolution videos", Neural Networks, 2009,A,Jun. 14, 2009, pp. 1439-1445, XP031498493,IEEE, Piscataway, NJ, USA; ISBN: 978-1-4244-3548-7.
(Continued)

*Primary Examiner* — Andrew W Johns
(74) *Attorney, Agent, or Firm* — Kilpatrick Townsend & Stockton LLP

(57) ABSTRACT

A method for selecting frames used in face processing includes capturing video data featuring a face of an individual and determining with a processing unit at least one image quality indicator for at least some frames in the video data. The quality indicator is used for selecting a subset of the frames and a sequence of frames is determined corresponding to a movement of a body portion detected in the video data and/or corresponding to a response window during which a response to a challenge should be given. At least one second frame is added to the subset within a predefined interval before or after the sequence and the selected frames are stored in a memory.

17 Claims, 3 Drawing Sheets

(58) Field of Classification Search
CPC ........... G06K 9/00711; G06K 9/00744; G06K 9/00899; G06K 9/00906
See application file for complete search history.

(56) References Cited

U.S. PATENT DOCUMENTS

2016/0366129 A1* 12/2016 Chen et al. ............. G06F 21/32
2018/0173959 A1* 6/2018 Shah et al. ......... G06K 9/00744

OTHER PUBLICATIONS

Alba-Castro Jose et al: "Pose-corrected face processing on video sequences for webcam-based remote biometric authentication",SPIE, PO BOX 10 Bellingham WA 98227-0010USA, Mar. 13 2008, pp. 1-12,XP040447003.
Argones-Rua A E. et al: "On the use of quality measures in face and speaker identity verification based on video and audio streams",IET Signal Proces,,vol. 3, No. 4, Jul. 1 2009,pp. 301-309, XP006033295,ISSN: 1751-9683, DOI:10.1049/IET-SPR:20080170.
Deborah Thomas et al: "Multi-frame Approaches To Improve Face Recognition",Motion and Video Computing, 2007.,Feb. 23 ,2007, p. 19,XP032392000,IEEE, PI, US,DOI: 10.1109/WMVC.2007.29.
Zhiwei Zhang et al: "A face antispoofing database with diverse attacks", 5th IAPR International Conference on Biometrics (ICB),Mar. 29, 2012; pp. 26-31,XP032215525,1EEE, Piscataway, NJ, USA.
PCT/IB2016/057729 International Search Report and Written Opinion, dated Aug. 4, 2017; 12 pages.
PCT/IB2016/057729 International Preliminary Report on Patentability, dated Jun. 18, 2019; 8 pages.

* cited by examiner

METHOD FOR SELECTING FRAMES USED IN FACE PROCESSING

FIELD OF THE INVENTION

The present invention relates to the field of face processing. In particular, the invention relates to the selection of frames in face processing.

DESCRIPTION OF RELATED ART

Face processing involves the processing of images of the face. A face processing system is a computer based system capable of processing a face in a digital image or video. Face processing methods may involve for example determination of emotions; face classification; face morphing; pose detection; gaze detection; face detection in complex images; etc.

As an example of face processing, face recognition involves the identification or verification of a person in a test image or video, using a comparison with reference images in a database. Face recognition is typically used in access control systems.

The images used in image face processing are commonly captured with a video camera, such as for example a camera in a smartphone, a tablet, a laptop, a smart watch, a smart glass, a smart TV, a digital personal camera, a security camera, etc. The camera delivers a video stream comprising a plurality of frames. The faces in the frames are detected and processed.

This processing could be performed locally, i.e., in the equipment that captures the video, or remotely, for example in a personal computer or in a remote server with a high processing power and/or access to a database of reference images. A local processing is usually faster and less expensive, since the video stream does not need to be transferred to the remote equipment through a network. However, the local equipment often lacks the required processing power or the reference images to which the captured face should be compared in case of face recognition.

Therefore, many face processing applications require the video stream to be transmitted remotely for further processing. Even if the video data is compressed, this transmission is a costly and slow process.

According to one aspect, it has been recognised that not all applications of face processing require the complete video stream to be transmitted remotely. In fact, consecutive frames in a video often include a similar and redundant content, such as successive images of the same face from the same point of view.

Even if the face processing application is executed locally in the user equipment, it is not needed to repeat it on each frame of a video stream. In fact, many applications such as face recognition or face classification only require one or a limited number of still images, i.e., frames. Limiting the number of frames to be processed leaves processing power available for other applications and reduces the power consumption of the user equipment.

Therefore, according to one aspect, an aim of the present invention is to provide a method and apparatus for selecting one or a limited number of frames from a video stream and use the selected frames for face processing.

Algorithms for extracting key frames from a video stream are known as such. As an example, they are often used to select the most informative frames from a video, with the goal of representing the most significant content of the video with a limited number of still images. As an example, U.S. Pat. No. 7,889,794 uses a camera motion sensor in a video camera to provide information during the image capture regarding camera motion. The video is then segmented into a plurality of video segments based on the camera motion estimate, and a key frame is extracted from each video segment.

US2016063343A is directed to a method for selecting frames from a video sequence. In a first step, a subset of reference key frames are isolated from the video. A sharpness score is then calculated for each of a plurality of candidate frames that are adjacent to each reference key frame, iteratively until the candidate with the highest sharpness score is identified for each reference key frame. The frames with the highest quality score are then selected. A drawback of this solution is that the selected candidate frames for two reference key frames may be very close to each other, or even adjacent. The informative content from two adjacent frames is often very close, so that this method may produce redundant frames.

The selection of frames in US2010118205 is based on a tracking unit for determining when existing items leave the scene or when new items appear.

Those previously known frame extraction methods find applications in video summarization, creating chapter titles in DVDs, video indexing, and making prints from video, and so on. The selected frames are usually not the ones one would need in a face processing algorithm. For example, a method that detects transitions in order to extract one frame from each shot in the video is inappropriate in face recognition, since face recognition often comprises only one shot with the camera close to the face, and no transitions, no cuts and almost no movements of the camera.

On another aspect, face authentication and face identification are widely used as biometric user verification methods. However, the possibility of subversion of those systems by determined adversaries (e.g. by presenting a 2D-printout photograph or a 3D mask, replaying a video, etc.) is now considered as an inherent part of any biometric systems. Therefore, there is a need for countermeasures to detect subversive recognition attempts or presentation attacks (also known as "spoofing attacks"). According to the International Standard (ISO/IEC 30107), the automated determination of such presentation attacks is defined as presentation attack detection (also known as "anti-spoofing countermeasures").

Challenge-response strategies are known in the prior art for verifying the liveness of the user. As an example, face recognition systems are known in which the user is invited to perform a specific face movement, such as a blink, at a random instant. A photograph, video or mask can't reproduce the face movement on request, and is rejected. It has been found, however, that some agile attackers manage to fool the liveness detector by temporarily replacing a photograph, video or mask by their own face and performing the requested movement. Thus, the liveness detector detects that the requested face movement was performed when requested, while the face recognition system will recognize the face from the photograph, mask or video captured on other frames.

BRIEF SUMMARY OF THE INVENTION

It is therefore an aim of the present invention to propose a new method for extracting frames from a video sequence which is more adapted to face processing applications.

It is therefore an aim of the present invention to propose a new method for extracting frames from a video sequence which is more adapted to face processing applications when a presentation attack detection scheme is used.

According to the invention, these aims are achieved by means of a method for selecting frames used in face processing, comprising:

a) Capturing with a camera video data featuring a face of an individual;

b) Determining with a processing unit at least one image quality indicator for at least some frames in said video data;

c) Using said quality indicator for selecting a subset of said frames;

d) Determining a sequence of frames corresponding to a movement of a body portion detected in said video data and/or corresponding to a response window during which a response to a challenge should be given;

e) Adding to said subset at least one second frame within a predefined interval before or after said sequence;

f) Storing the selected frames in a memory.

In one embodiment, only the frames with a sufficient level of quality are selected in step c).

In fact, video of a face often includes movements of a body portion, such as blinks, movements of the mouth, movements of the whole face, of one hand, etc. Those movements are called "liveness events".

Those movements of body portions could be involuntary or voluntary. Involuntary liveness events could occur at any time. Voluntary movements could occur during a predefined response window and in response to a challenge prompted by the system for verifying if the captured face is a human one and capable of such a liveness event.

The frames featuring such a movement should be removed, since the appearance of the face may change during the event, which is prejudicial to many face processing algorithms. For examples, frames with closed eyes or a turned head should be removed.

In one embodiment, a presentation attack detection scheme based on a challenge-response strategy is used. In this case, the movement of a body portion may be a voluntary response to a challenge, and should be made within a predefined response window, for example within 2 seconds after the challenge is prompted to the user. In this case, the second frame added during step e) is selected within a predefined interval before the start or after the end of the response window. Therefore, frames within the response windows which are likely to include a movement of a body portion are not selected as second frame.

Alternatively, or in addition, the second frame is selected within a predefined interval before or after a sequence during which a movement of a body portion as a response to a challenge is detected. This alternative requires a detection of movement, but can select second frames very close to the event, including frames within the response window.

In one embodiment, a presentation attack detection scheme based on passive liveness detection (i.e. not challenge-response based) is used.

In this case, the liveness event could correspond to an involuntary movement of one body portion, and the second frame is selected within said predefined interval before or after the sequence of frames covering the period during which said movement of a body portion is detected.

In such situations, the method selects one frame adjacent, or within a predefined interval to a sequence of frames during which a movement of a body portion is detected, in order to reduce the risk that an attacker quickly replaces the presentation attack instrument (e.g. photograph, mask, etc.) by his own face to simulate a liveness event.

The movement can correspond to one of the following movements:

a blink;

a head movement;

a movement of the eyebrow, cheek, and/or mouth;

a displacement of the camera relative to said face.

All selected frames are preferably separated from each other at least by a time interval greater than the interval between two consecutive frames. Therefore, the subset does not include consecutive frames.

As an example, the interval between two selected frames is at least 100 ms.

Selecting frames separated by an interval, and avoiding the risk of selecting adjacent or nearly adjacent frames, usually generates a less redundant, more informative subset of frames, and thus increases the reliability of the processing.

The processing unit is used for determining at least one image quality indicator for at least some frames in the video data. This quality indicator can be used for selecting at least some frames in the subset. Therefore, the frames with a high quality are more likely to be selected than frames with a low quality, thus improving the reliability of the face processing.

A quality indicator may depend on at least one of the following parameters for the whole frame:

Quality of illumination;

Sharpness;

Blur;

Noise level.

Alternatively, or in addition, a quality indicator may depend on at least one of the following parameters separately determined for the portion of the image corresponding to said face:

Quality of illumination;

Sharpness;

Blur

Noise level;

Face orientation;

Size of the face;

Occlusion or reflects;

User expression;

Likelihood that the image corresponds to a face;

Liveness.

Therefore, the selection of frames depends on the quality of the portion of the image which is the most important for the face processing, i.e., the portion of image corresponding to the face.

This frame selection method may be performed during an enrolment phase of a biometric face recognition process.

This frame selection method may be performed during a test phase of a biometric face recognition process.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
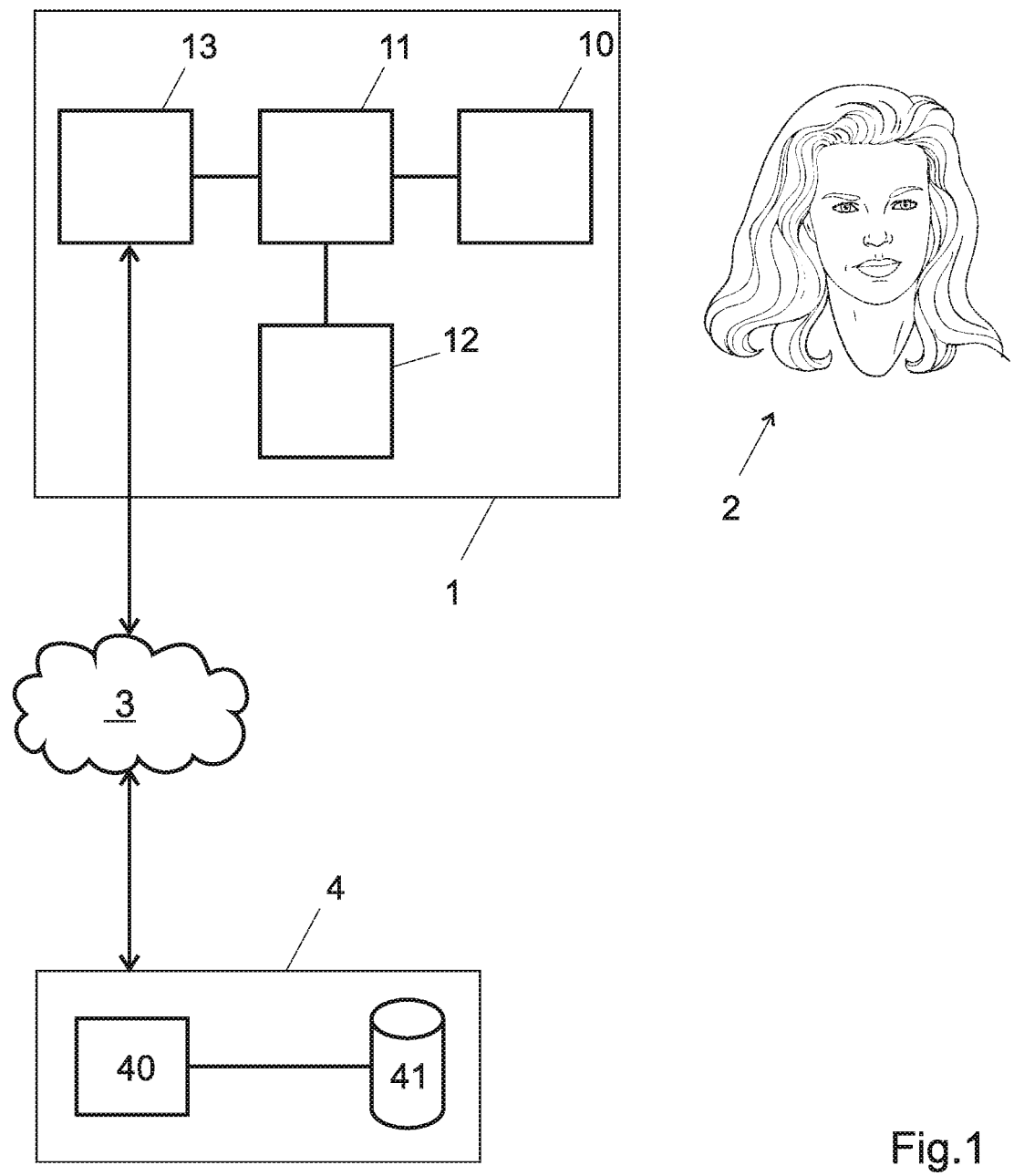
FIG. 1 is a schematic view of an apparatus according to the invention.

FIG. 1 illustrates a system that could be used in one embodiment of the invention. It comprises a user personal equipment 1, such as without limitation a smartphone, a digital personal camera, a tablet, a computer with a webcam, a laptop, a smart watch, a smart glass, a video camera in a car, a security camera, other wearable device, etc. The personal equipment 1 comprises a camera 10, such as a CMOS, CCD, RGB-D or 3D camera, for capturing a series of frames, i.e., a video, of a scene 2. In the illustrated example, the scene comprises a face 2, for example the face of a user of the personal equipment who wants to be recognised or otherwise processed.

The user equipment further comprises a processing unit 11, such as a microprocessor or a microcontroller, for controlling the camera 10 and the other components of the equipment, and for processing the video data captured with the camera. In one embodiment, the processing unit executes an operating system, such as without any limitation Android, iOS, Windows, Unix (all registered trademarks), and one or a plurality of software applications or programs for controlling the operations of the user equipment. The software applications/programs and the data, including the video data, are stored in a memory 12, such as a permanent or non-permanent memory. A transmitting unit 13, such as without limitation a cellular module, a WiFi module, a Bluetooth module, a nfc module, etc., is operatively connected with the processing unit 11 for sending and/or receiving data over a communication network, such as a wireless communication network 3, for example a Wireless LAN, a personal area network, and/or the Internet, etc.

The data could be sent to or received from remote equipment 4, such as a remote server, set of servers, personal computer, or in the cloud. The remote equipment 4 comprises a remote processing unit, such as a processor, and a database 41.

The user's equipment may also include input/output components, such as a display, a loudspeaker, a microphone, buttons, a touch screen, a keyboard, etc. Those components can be used for displaying messages to the user, such as prompt messages, and for entering instructions from the user.

Figure 2:
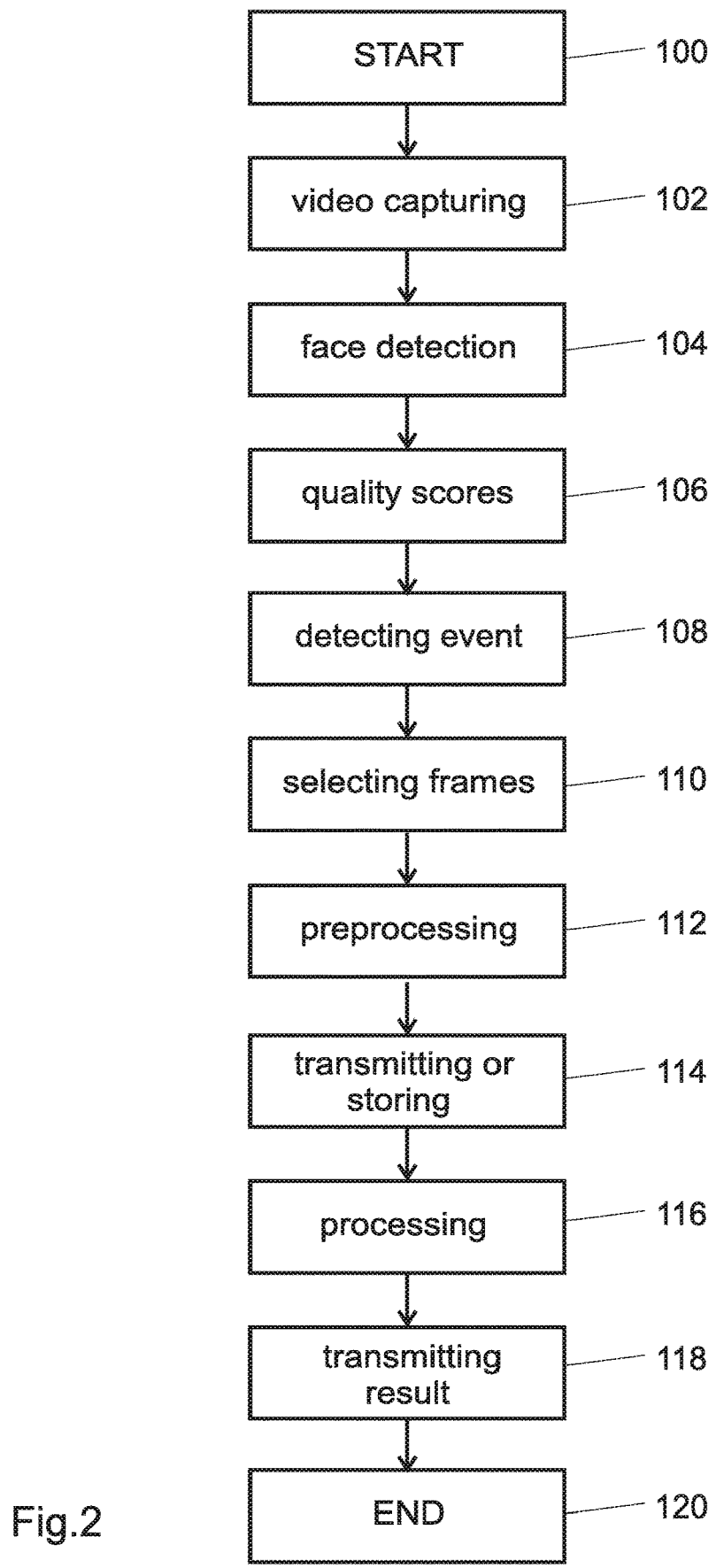
FIG. 2 is a flowchart of the method of the invention.

The flowchart of FIG. 2 illustrates an example of steps that could be used in one embodiment of the invention. Some of those steps could be executed with some of the components of FIG. 1, for example by a program stored in memory 12 and executed by the processing unit 11 in the local equipment 1, and/or by the processing unit 40 in the remote equipment 4.

The process starts at step 100. In step 102, a video stream is captured by the camera 10 of the user's local equipment. The capture delivers video data, i.e., a set of frames $150i$ (FIG. 3) stored in memory 12, representing a user 2 whose face needs to be processed, for example identified, authenticated or otherwise classified.

In step 104, a module executed by the processing unit 11 detects faces in the frames $150_i$, and detects the orientation of the user's face in at least some of the frames. The module might also rectify this orientation in order to generate a front view of the user's face. The module might also detect the size of the face in each of the frame. If the size is too small or too large, and/or if the orientation of the face in the frame is not the one that was desired and can't be corrected, the frame could be rejected; in such a case, the user might be invited to move his face and/or the camera 10.

In step 106, at least one image quality indicator $q_{ij}$ is assigned to each or some frames i by a module executed by the processing unit 11.

Various quality indicators $q_{ij}$ might be combined, possibly with different weights, in order to determine an overall quality score $Q_i$ for the whole frame $150_i$ and/or for the face. It is for example possible to determine a regression function for estimating from a set of frames with different quality indicators which one should be used.

The quality score $Q_i$ depends on at least one of the following quality indicators $q_{ij}$, determined for the whole frame $150_i$:
Quality of illumination;
Sharpness;
Blur;
Noise level.

The quality score $Q_i$ may also include at least one quality indicator $q_{ij}$ separately determined for the portion of the frame $150_i$ corresponding to the face:
Quality of illumination of the face;
Sharpness of the face;
Blur of the face;
Noise level of the face;
Face orientation (pose);
Size of the face;
Occlusion (such as hairs, hands, etc.) or reflects (especially on glasses);
User expression. The corresponding quality indicator may be reduced for example if the user has closed his eyes, open his mouth, etc.:
Likelihood that the image corresponds to a face;
Liveness, as indicated by a liveness detector.

One quality indicator $q_j$ might depend on a similarity of the frame $150_i$ to a reference image. For example, the method might be used during a test phase of a biometric face recognition process, in order to compare images of an individual with models in a reference database, and to identify or authenticate the individual. In such a scenario, a frame having quality indicators similar to the ones of the reference image is preferably selected. As an example, if a reference image has a low quality indicator for the orientation (possibly because the reference image is not exactly a front view), frames with the same orientation and same low quality indicator for the orientation will be preferred. Similarly, if a reference image is underexposed, overexposed, blurred, unsharp, noisy, occluded, etc., those frames that present similar defaults will be preferred during the test phase of a biometric face recognition process, since they are more likely to match the reference frame.

At least one quality indicator $q_j$ might be determined by a computer analysis of the image and/or of the face. The quality of illumination of the whole image and/or of the face might for example depend on the contrast range, on portions of underexposed or overexposed pixels, etc.

If one quality indicator $q_j$ is lower than a predefined threshold, the system may prompt the user to apply an appropriate correction, for example to switch on a light, avoid shaking, etc.

Additionally, or alternatively, if one quality indicator $q_{ij}$, and/or the overall quality score $Q_i$, is lower than a corresponding predefined threshold, the corresponding frame may be rejected. For example, a frame on which the user is blinking, or a frame on which the illumination of the face is not sufficient, may be rejected. The frames in which no face is detected are rejected; the user may be invited to move his face in front of the camera.

In step 108, a module executed by the processing unit 11 detects at least one sequence of frames covering a period p during which a movement of a body portion is detected. The sequence may include one or a plurality of frames $f_{period}$.

A movement of a body portion (e.g. a blink) might be unintentional; his detection can be used as a proof of liveness, for preventing a presentation attack with a photograph or other static image.

Other movements of body portions might be intentional, for example in response to a prompt by the user's local equipment 1 for a response to challenge. As an example, the processing unit may invite a user to move his head or to blink at a given instant in order to prevent presentation attacks. Other examples of challenges may include an invitation to move a portion of the face, such as the eyebrows, the mouth, one cheek, etc., or an invitation to perform a head movement, or a movement of the hand. The module uses a computer vision method to detect the sequence of frame frames in which such a liveness event is present.

The steps 104 to 108 may be performed in any possible order, or in parallel.

Figure 3:
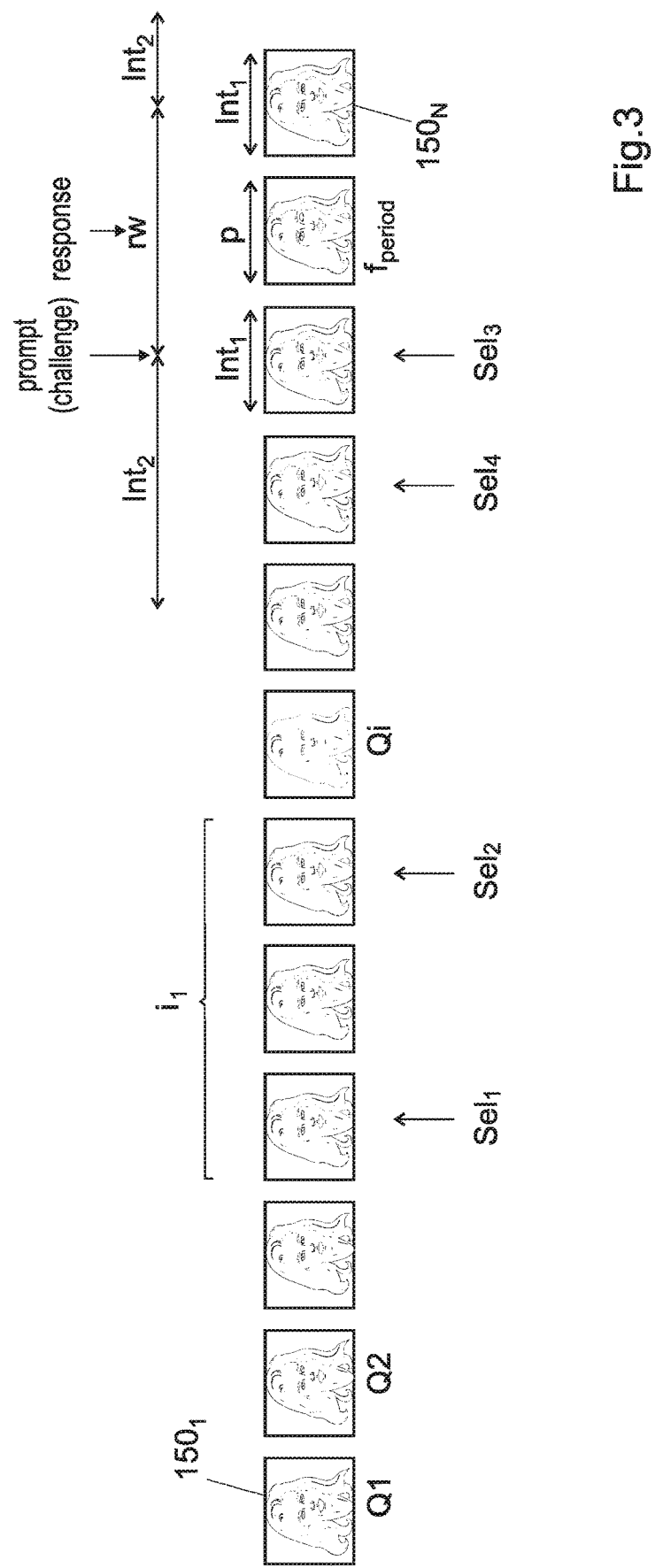
FIG. 3 illustrates a series of frames captured with the method of the invention, including a subset of selected frames $Sel_1$-$Sel_4$.

In step 110, a module executed by the processing unit 11 selects a subset of frames from the whole set of frames $150_i$ in the video (FIG. 3). In this process, the frames $150_i$ (such as the frames $Sel_1$ and $Sel_2$ in the example) with high quality scores $Q_i$ are more likely to be selected in the subset than frames with a low quality scores. Similarly, frames in which the user's face is too small, too large, or not correctly oriented, are more likely to be rejected. In the example of FIG. 3, the frames Sel1 and Sel2 on FIG. 3 are selected based on their quality and distance.

In one embodiment, the method comprises a step of selecting in the subset frames $150_i$ with at least some of the quality indicators $q_{ij}$ matching quality indicators of a reference image. For example, in the test phase of a face recognition process, the method might include a selection of frames with the quality indicators which are the closest to the quality indicators of a reference image to which the frame should be compared—instead of selecting the frame with the best quality indicator. For example, if the orientation of the face in the reference image is not perfect (low quality indicator), the method will try to find a test frame with a corresponding quality indicator.

Some quality indicators $q_{ij}$ and/or quality scores $Q_i$ might be compared with a threshold. A frame $150_i$ with a quality indicator $q_{ij}$ and/or with an overall quality score $Q_i$ lower than the corresponding threshold will be rejected. Different thresholds might be defined for different scenarios; for example, a first threshold might be defined for selecting a frame used for an enrolment phase of a face recognition process, while a different threshold might be defined for the test phase of a face recognition process. The thresholds might also be adjusted as a function of the level of security requested by an administrator of the system.

The selection process does not depend only on the quality $Q_i$ of the frames 150 or on the size and orientation of the face. In order to ensure that the selected frames in the subset are not consecutive, and not too close to each other, the module preferably determines the time interval $I_j$ between candidate frames; the selection depends on this interval. For example, a frame with very high quality indicators, correct size and correct orientation of the face, might be rejected if the interval to another selected frame in the subset is lower than a predetermined threshold. This threshold might for example depend on the overall duration of the video, and be determined in order to select a predetermined number of frames which are roughly regularly spread over the duration of the video. In many applications, this more or less regular repartition of the selected frames improves the quality or reliability of the face processing. For example, basing a face recognition application on several frames taken at various instants during a video improves the robustness of the recognition, and reduces the risk of presentation attacks during a part of the video.

In one embodiment, the number of selected frames in the subset is lower than 10, and the minimal interval between selected frames is higher than 100 ms. A video of 1 to 5 seconds is then sufficient for capturing 10 frames separated by 100 ms at least.

In one embodiment, the frame selection module selects frames $150_i$ in the subset with an overall quality score $Q_i$ higher than a threshold and at a minimum distance from the previous selected frame.

In the example of FIG. 3, the minimal interval between two frames is one, to avoid the selection of adjacent frames. Frames $Sel_1$ and $Sel_2$ can thus be selected because they are separated by an intermediate frame In another embodiment, the frame selection module selects the frame $150_i$ with the highest overall quality score $Q_i$ in a window at a minimum distance after the previously selected frame. Frames which are closer than this minimum distance are rejected, even if their quality score is high.

As indicated, sequences of frames $f_{period}$ corresponding to a period p during which a voluntary or involuntary body movement is detected are preferably rejected since many face processing algorithms don't react well to such an event. For example, a face recognition module is less likely to recognise a user on a frame $f_{period}$ where he is blinking or moving his head. Therefore, sequences of frames $f_{period}$ corresponding to a period where the user is moving a body portion are less useful for the face recognition and should be detected and rejected from the selection of frames in the subset.

However, in one aspect, the frame $Sel_3$ immediately before or immediately after such a period p, and/or at least one frame within a limited interval $Int_1$, $Int_2$ before and/or after this period, is selected and added as a second frame to the subset. This improves the robustness of the presentation attack detection module, since a user trying a presentation attack would not have the time to replace the presentation attack instrument by his face when he is invited to reply to a challenge or to simulate a voluntary or involuntary movement of a body portion. The interval $Int_1$, $Int_2$ before and/or after the period could be equal, or different. It is also possible to select only one frame in an interval before, or in an interval after the period.

As indicated, a movement of a body portion may be voluntary, as a response to a challenge when the processing unit prompts the user for a movement of a body portion. In such a situation, the user may have a limited amount of time to perform the challenge within a predefined response window rw, such as for example within 5 seconds, for example within 2 seconds, after the start of the response window, for example after the prompt. In such a situation, the frame $Sel_4$ immediately before or immediately after the response window rw, or one frame within a limited interval $Int_2$ around this response window, is selected and added as a second frame to the subset.

An information that a response to a challenge was detected in a given frame may be stored and used by a presentation attack detection module.

In step 112, the selected frames $Sel_1$, $Sel_2$, ... in the subset are preprocessed. The preprocessing might include, without limitation, a correction of the illumination, a correction of the contrast, a noise reduction, a sharpness increase, a white balance correction, a foreground extraction, a cropping, a colour channel separation, a compression coding, and/or a resampling, etc. Some or all of those operations might also be performed before the selection of frames, or before the evaluation of the quality indicators.

In step 114, the preprocessed frames are transmitted over the network 3 to the remote equipment 4 that performs the face processing in step 116. Since only a limited number of selected frames is transmitted, the cost and time for this transmission is limited. The face processing might include a biometric feature extraction from each frame, and a comparison of the extracted features with references in the database 41, in order to classify, identify or authenticate the user shown on the frames. The face processing might also include a biometric feature extraction.

The face processing might be part of an enrolment phase of a face recognition process, in order to save new biometric face reference models in a database. In this case, only frames with high quality indicators will be used; other frames with at least one quality indicator lower than a threshold are rejected. The method can include a step of determining and saving one or a plurality of quality indicators, in order to select frames with similar quality indicators during a later test phase of a face recognition process.

Alternatively, or in addition, the face processing might be part of an online step, in order to recognise a user through a comparison with previously stored biometric face reference models. In this case, the threshold for at least some of the quality indicators might be lower than for the enrolment phase; frames that would not be considered acceptable for the enrolment phase might thus be selected for the test, in order to increase the user convenience.

In step 118, a result is transmitted by the remote equipment 4 to the local equipment 1. This result might be for example a classification, an identification, or a confirmation of the identity of the user, possibly with a probability score.

The face processing step 116 might also be performed locally in the local equipment, without the need for the transmission steps 114 and 118. In this case, the frame selection ensures a fast and reliable face processing based on a limited number of frames.

The methods disclosed herein comprise one or more steps or actions for achieving the described method. Unless a specific order of steps or actions is specified, the order and/or use of specific steps and/or actions may be modified without departing from the scope of the claims.

It is to be recognized that depending on the embodiment, certain acts or events or steps of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Some embodiments of the present invention have been described in terms that would ordinarily be implemented as software programs. Those skilled in the art will recognize that the equivalent of such software may also be constructed in hardware, and that hardware implementations could confer advantages that may enable use of this invention in a wider variety of applications such as in real-time systems. Accordingly, the various operations of methods described above may be performed by any suitable means or module capable of performing the corresponding functions. The means or modules may include various hardware and/or software component(s) and/or module(s), including, but not limited to a circuit, an application specific integrated circuit (ASIC), a processor, a field programmable gate array signal (FPGA) or other programmable logic device (PLD), discrete gate or transistor logic, discrete hardware components or any combination thereof designed to carry out the method steps described herein.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method used in a personal equipment for selecting frames used in face processing, comprising:
   a) Capturing with a camera video data featuring a face of an individual;
   b) Determining with a processing unit at least one image quality indicator ($q_{ij}$) for at least some frames in the video data;
   c) Using the quality indicator ($q_{ij}$) for selecting a subset of the frames ($Sel_1$, $Sel_2$);
   d) Detecting a sequence of frames (fperiod) corresponding to a movement of a body portion in the video data and/or corresponding to a response window (rw) during which a response to a challenge should be given;
   e) Adding to the subset at least one second frame ($Sel_3$, $Sel_4$) within a predefined interval ($Int_1$, $Int_2$) before or after said the sequence; and
   f) Storing the subset of frames ($Sel_1$, $Sel_2$, $Sel_3$, $Sel_4$) in a memory.

2. The method of claim 1, comprising:
   prompting a user for a response to a challenge;
   detecting the movement of a body portion as the response; and wherein second frame ($Sel_3$) is selected within the predefined interval ($Int_1$) before or after the sequence $_{(fperiod)}$ during which the movement of a body portion is detected.

3. The method of claim 2, wherein the response corresponds to one of the following voluntary movements:
   a blink;
   a head movement;
   a movement of the eyebrow, cheek, and/or mouth; and/or
   a displacement of the camera relative to the face.

4. The method of claim 1, comprising:
prompting a user for a response to a challenge;
waiting during the response window (rw) for the movement of a body portion as the response to the challenge;
and wherein the second frame ($Sel_4$) is selected within the predefined interval ($Int_2$) before said prompting the user or after the end of the response window (rw).

5. The method of claim 1 the movement being an involuntary movement, the second frame ($Sel_3$) being selected within the predefined interval ($Int_1$) before or after the sequence $_{(fperiod)}$ during which the movement of a body portion is detected.

6. The method of claim 1 wherein a frame ($Sel_3$) immediately adjacent to the sequence $_{(fperiod)}$ is selected as the second frame.

7. The method of claim 1, wherein consecutive frames are excluded in said subset.

8. The method of claim 1, wherein the quality indicator ($q_{ij}$) depends on at least one of the following parameters for the whole frame:
quality of illumination;
sharpness;
blur;
noise level.

9. The method of claim 1, wherein the quality indicator ($q_{ij}$) depends on at least one of the following parameters separately determined for the portion of the image corresponding to the face:
quality of illumination;
quality of illumination;
sharpness;
blur;
noise level;
   face orientation;
   size of the face;
   occlusion or reflects;
   user expression;
   likelihood that the image corresponds to a face; and
   liveness.

10. The method of claim 1, performed during an enrolment phase of a biometric face recognition process.

11. The method of claim 1, performed during a test phase of a biometric face recognition process.

12. The method of claim 11, the selection depending on a similarity of at least one frame quality indicator of at least one test frame with at least one reference frame.

13. The method of claim 1, further comprising:
pre-processing the frames ($Sel_1$, $Sel_2$, . . . ) in the subset;
sending the pre-processed frames remotely.

14. The method of claim 13, the pre-processing comprising rectifying the pose of the individual.

15. The method of claim 13, further comprising:
receiving the remotely sent frames in a remote equipment;
extracting biometric features from the frames.

16. User equipment for selecting frames used in face processing, comprising:
a) a video camera for capturing video data with the face of an individual;
b) a processing unit arranged for:
determining at least one image quality indicator ($q_{ij}$) for at least some frames in the video data;
using the quality indicator for selecting a subset of the frames ($Sel_1$, $Sel_2$ . . . );
determining a sequence of frames $_{(fperiod)}$ corresponding to a movement of a body portion in the video data and/or corresponding to a response window (rw) during which a response to a challenge should be given;
adding to the subset at least one second frame ($Sel_3$, $Sel_4$) within a predefined interval ($Int_1$, $Int_1$) before or after the sequence;
c) a memory for storing the frames in the subset.

17. A non-transitory computer-program product tangibly embodied in a machine-readable non-transitory storage medium that includes instructions configured to cause one or more processors to:
a) capture with a camera video data featuring a face of an individual;
b) determine with a processing unit at least one image quality indicator ($q_{ij}$) for at least some frames in the video data;
c) using the quality indicator ($q_{ij}$) for selecting a subset of the frames (Sel1, Sel2);
d) detect a sequence of frames (fperiod) corresponding to a movement of a body portion in the video data and/or corresponding to a response window (rw) during which a response to a challenge should be given;
e) add to the subset at least one second frame ($Sel_3$, $Sel_4$) within a predefined interval ($Int_1$, $Int_1$) before or after the sequence; and
f) store the subset of frames ($Sel_1$, $Sel_2$, $Sel_3$, $Sel_4$) in a memory.

* * * * *